Patented Mar. 18, 1941

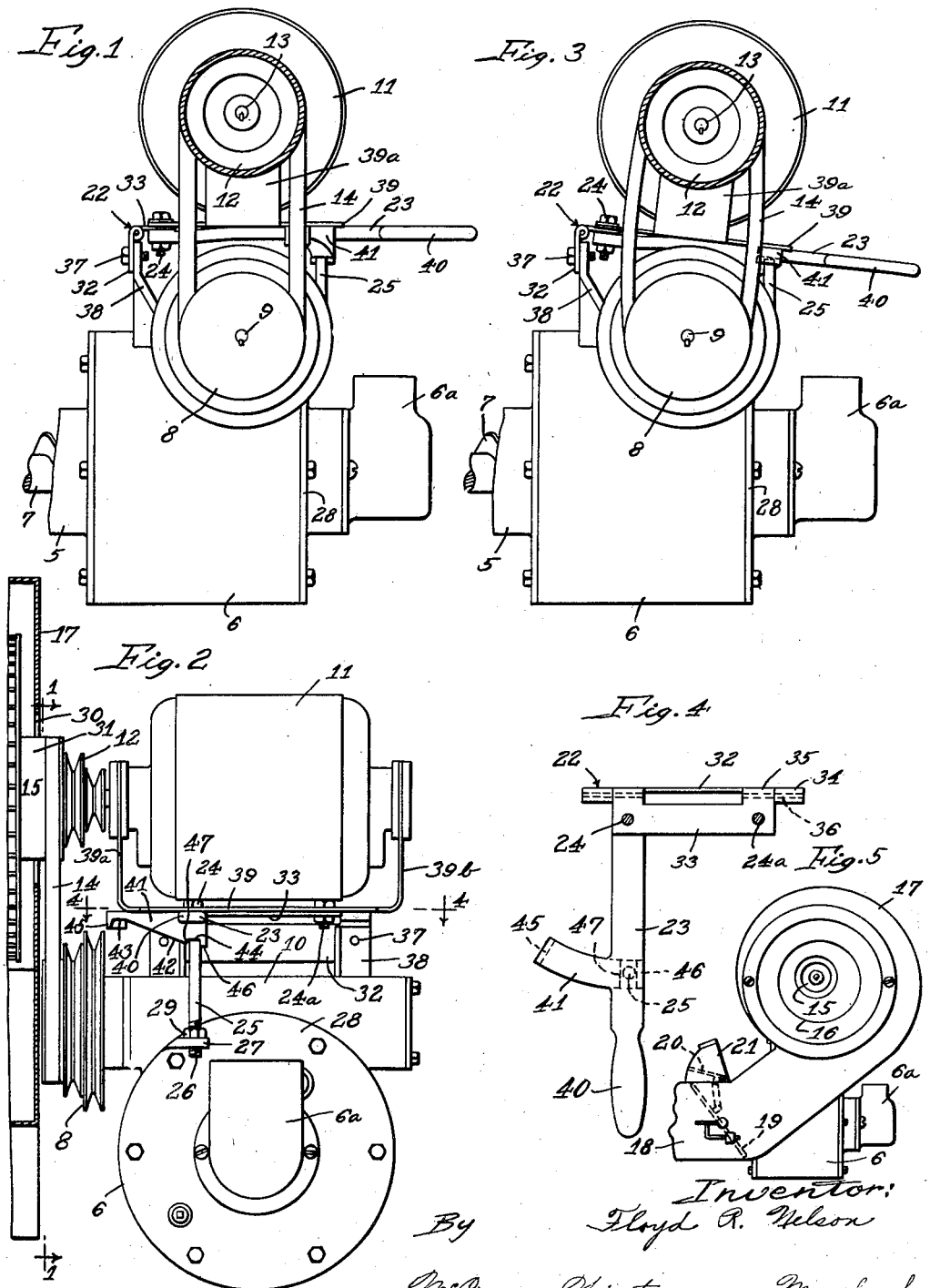

2,235,441

UNITED STATES PATENT OFFICE 2,235,441

BELT TAKE-UP

Floyd R. Nelson, Rockford, Ill., assignor to Cotta Transmission Corporation, Rockford, Ill., a corporation of Illinois Application March 17, 1939, Serial No. 262,343

11 Claims. (Cl. 74—242.15)

This invention relates to a stoker and a belt drive slack take-up therefor.

It has been common practice to provide springs in connection with belt driven stokers and other devices to keep the belt under tension, but I have found that there are certain serious objections to such an arrangement, the principal one being that as the belt stretches and wears, the tension becomes lighter and lighter and there is consequently too much danger of slippage and loss of power. It is therefore the principal object of my invention to provide a positive but adjustable type of slack take-up, which, besides having the advantage of permitting proper tensioning of a belt after it has become stretched and worn, has the further advantage of permitting quick and easy release of tension during prolonged idle periods, so as to avoid stretching the belt, or whenever it is desired to disconnect the drive motor from the driven mechanism, as, for example, to switch the belt to a different position on the cone pulleys to change the drive ratio.

The invention is illustrated in the accompanying drawing, in which—

Figs. 1 and 2 are respectively a side view and rear view of a motor driven stoker drive embodying my improved slack take-up for the belt; Fig. 1 being a section on the line 1—1 of Fig. 2;

Figure 3 is a view similar to Fig. 1, but showing the motor in another position relieving the belt of tension;

Fig. 4 is a sectional detail on the line 4—4 of Fig. 2, showing the cam lever in plan view; and Fig. 5 is a small scale side view of Fig. 2 showing the fan housing and air conduit.

The same reference numerals are applied to corresponding parts throughout the views.

Referring to the drawing, the numeral 5 designates a collar extending rearwardly from the bottom of the hopper of a stoker to the drive housing 6 to enclose the rear end of the coal feed screw 7 and its coupling connection with a driven worm gear in the housing. The driven cone pulley 8 is carried on a transverse shaft 9 which carries a worm inside the hollow boss 10 meshing with the worm gear in the housing 6. At 6a is indicated a shear pin switch housing in which a shear pin is provided connecting the feed screw with the gear driven off shaft 9. This pin shears if there is any overload on the drive motor, as, for example, in case a stone or spike gets jammed in the coal conduit, and the shear pin operated switch thereupon opens the motor circuit. The electric motor 11 for driving the screw 7 has a cone pulley 12 on its armature shaft 13 disposed over the cone pulley 8, and a belt 14 works on these pulleys to transmit drive to the shaft 9 and thence to the coal feed screw 7, whereby to feed coal from a hopper through a suitable conduit to a retort in the furnace. The pulley 12 is integral with a fan rotor 15 of the well known peripherally bladed type which draws air in at the center, through hole 16 in the side of the fan housing 17, and discharges the air tangentially into the air conduit 18. The fan obviously operates always at motor speed regardless of the setting of belt 14 on pulleys 8 and 12. A damper 19 is provided in the conduit 18 to regulate the delivery of air to the retort in the furnace and is operated automatically by a vane 20 in the housing 21, as set forth in my copending application, Serial No. 253,631, filed January 30, 1939, so as to open wider when resistance to flow of air through the fire bed increases, and vice versa. Now, in my Patents 2,013,348 and 2,037,260 I disclosed a hinge mounting for the drive motor and explained that the motor had a spring acting to keep the motor raised so as to keep the belt under tension. In the present case, I have also provided a hinge 22 for supporting the motor to swing up and down to and from operating position relative to the housing 6, but have dispensed with the spring and have provided a cam lever 23 pivoted at 24 on the hinge mounting for the motor and arranged to ride on the upper end of an adjustable post 25 in fixedly adjusted relation to the housing 6, whereby to permit positively raising the motor from a lower retracted position, shown in Fig. 3, to a raised operating position, as shown in Fig. 1, with the belt 14 positively tensioned so as to transmit drive substantially without slippage. The post 25 is shown as having the lower end 26 thereof threaded in a lug 27 provided therefor on the end plate 28 of the housing 6, whereby to permit threadedly adjusting the post upwardly to compensate for stretch and wear of the belt 14. A lock nut 29 serves to hold the post 25 in its adjusted position when tightened against the lug 27. The hole 30 in the opposite side wall of the fan housing from the air inlet hole 16 is elongated enough to provide ample working clearing for the intermediate hub portion 31 that connects the fan rotor 15 with pulley 12, in either of the two positions of the motor 11 described.

The hinge 22 is formed by two plates 32 and 33 which have cooperating knuckle portions 34 and 35 at opposite ends thereof receiving pintles 36. The plate 32 is suitably secured by screws 37 to projections 38 on top of the housing 6. The plate 33 is fastened at its opposite ends by the bolt 24 and another bolt 24a to the base plate 39 for the motor 11. This base plate 39 has upward extensions 39a and 39b on its opposite ends resiliently supporting the motor housing thereon. The cam lever 23 extends from the bolt 24 under the base plate 39 and has a handle portion 40 on its free end which projects outwardly from the base plate 39 to the extent indicated in Figs. 1 and 3. A cam portion 41 is formed integral with the lever 23 and projects laterally therefrom, as clearly appears in Figs. 2 and 4. This cam is struck on an arc with the pivot 24 as a center, as clearly appears in Fig. 4. The top surface of the cam portion 41 is flat and in the same horizontal plane with the base plate 39, but the bottom surface 42 is inclined at an acute angle with respect to the top surface to form a wedge, which, in its sliding engagement with the top of the post 25 as the lever 23 is swung to the left (see Fig. 2), causes the motor 11 to be raised toward operating position. There is a flat dwell 43 at one end of the surface 42 and another flat dwell 44 at the other end alongside downwardly projecting shoulders 45 and 46. These dwells mark the two opposite extreme positions of the lever 23, and movement past these positions is prevented by the projections 45 and 46 coming into engagement with the post 25. The dwell 44 is offset upwardly slightly relative to the end of the surface 42, as clearly shown at 47 in Fig. 2, with a view to positively but releasably locking the lever 23 in the operating position and avoiding any likelihood of the motor being dropped to its retracted position by reason of something being accidentally brushed against the projecting handle 40. The offset is so slight that the tension of the belt 14 is not affected, but the operator knows that when he hears the slight click which accompanies the riding off of the end of the post 25 onto the dwell 44, the belt 14 is fully tensioned and the motor is securely locked in its operating position. To release the motor and lower it to retracted position, the operator merely lifts up on the handle end 40 of the lever slightly while pulling the same to the right. The lever is moved to the right as far as it will go, the movement being limited by engagement of the projection 45 with the post 25.

With this slack take-up, the life of a belt is greatly increased, because one can easily adjust the post 25 to compensate for stretch and wear. There is consequently no danger of the belt slipping like there was where springs were used. Furthermore, with the present construction, one can quickly release the motor and lower it to retracted position, relieving the belt of tension throughout prolonged idle periods, as, for example, during the summer months in the case of a stoker drive. In that way, stretching of the belt is avoided and one may easily switch the belt on the cone pulleys to change the drive ratio when that is desired.

It is believed the foregoing description conveys a good understanding of the objects and advantages of my invention. While I have disclosed the belt drive on a stoker it should of course be apparent that the present improved slack take-up may be used on various other belt driven devices to equal advantage. The appended claims have been drawn with a view to covering all legitimate modifications and adaptations.

I claim:
1. In a belt drive, the combination of a driven shaft carrying a drive pulley, a motor support extending crosswise relative to said driven shaft and hingedly mounted in spaced relation to one side of said shaft on an axis substantially parallel thereto, quick takeup means cooperating with said support on the opposite side relative to said shaft for supporting the same in operative or retracted position farther from or closer to said shaft, a motor mounted on said support having an armature shaft disposed substantially parallel with the driven shaft and carrying a drive pulley substantially in alignment with the first mentioned drive pulley, and a belt extending over said pulleys to be tensioned when the motor support is moved to operative position, whereby to transmit drive to the driven shaft, said quick take-up means comprising a stationary member and a manually operable member movable on the motor support transversely with respect to said member and carrying a cam having an inclined surface arranged slidably to engage said stationary member.

2. A combination as set forth in claim 1, wherein said stationary member is threadedly adjustable toward and away from the manually operable member for varying the spaced relationship of said motor support to the driven shaft whereby to adjust the tension of the belt.

3. In a belt drive, the combination of a driven shaft carrying a drive pulley, a motor support extending crosswise relative to said driven shaft and hingedly mounted in spaced relation to one side of said shaft on an axis substantially parallel thereto, quick takeup means cooperating with said support on the opposite side relative to said shaft for supporting the same in operative or retracted position farther from or closer to said shaft, a motor mounted on said support having an armature shaft disposed substantially parallel with the driven shaft and carrying a drive pulley substantially in alignment with the first mentioned drive pulley, and a belt extending over said pulleys to be tensioned when the motor support is moved to operative position, whereby to transmit drive to the driven shaft, said quick takeup means comprising a stationary member and a manually operable lever pivotally mounted on the motor support for movement in a plane transversely with respect to the end of said member, and carrying a cam having an inclined surface arranged slidably to engage the end of said stationary member.

4. In a belt drive, the combination of a driven shaft carrying a drive pulley, a motor support extending over said driven shaft and hingedly mounted in spaced relation to one side of said shaft on an axis substantially parallel with said shaft, a motor mounted on said support having an armature shaft disposed substantially parallel with the driven shaft and carrying a drive pulley in substantially vertical alignment with the first mentioned drive pulley, a belt extending over said pulleys to transmit drive to the driven shaft, a substantially vertical post stationarily mounted on the opposite side of the driven shaft from the hinge axis of the motor support, and a manually operable cam lever pivotally mounted on the underside of the motor support for swinging movement laterally transversely with respect to the upper end of said post, and having an inclined cam surface on the bottom thereof slidably engaging the upper end of said post, whereby to raise the motor support when the lever is moved in one direction, said motor support being arranged to move by gravity to retracted position when the lever is moved in the other direction.

5. The combination set forth in claim 4, wherein said lever carries stop projections at opposite ends of the cam surface for abutment with the post to limit movement of the lever.

6. The combination set forth in claim 4, wherein said lever carries stop projections at opposite ends of the cam surface for abutment with the post to limit movement of the lever, and wherein said post is threadedly mounted in a stationary support for vertical adjustment.

7. The combination set forth in claim 4, wherein said lever carries stop projections at opposite ends of the cam surface for abutment with the post to limit movement of the lever, there being a flat, substantially horizontal dwell surface at one end of the cam surface alongside the stop projection whereby when the motor support is raised to the limit position, said post engages said dwell surface.

8. The combination set forth in claim 4, wherein said lever carries stop projections at opposite ends of the cam surface for abutment with the post to limit movement of the lever, there being a flat, substantially horizontal dwell surface at one end of the cam surface alongside the stop projection whereby when the motor support is raised to the limit position, said post engages said dwell surface, the dwell surface being furthermore in slightly recessed relation to the adjacent end of the cam surface, whereby to define a shoulder between the dwell surface and the cam surface to prevent accidental movement of the lever with respect to the post.

9. The combination set forth in claim 4, wherein said lever carries stop projections at opposite ends of the cam surface for abutment with the post to limit movement of the lever, there being a flat, substantially horizontal dwell surface at one end of the cam surface alongside the stop projection whereby when the motor support is raised to the limit position, said post engages said dwell surface, said post being threadedly mounted in a stationary support for vertical adjustment.

10. The combination set forth in claim 4, wherein said lever carries stop projections at opposite ends of the cam surface for abutment with the post to limit movement of the lever, there being a flat, substantially horizontal dwell surface at one end of the cam surface alongside the stop projection whereby when the motor support is raised to the limit position, said post engages said dwell surface, the dwell surface being furthermore in slightly recessed relation to the adjacent end of the cam surface, whereby to define a shoulder between the dwell surface and the cam surface to prevent accidental movement of the lever with respect to the post, said post being threadedly mounted in a stationary support for vertical adjustment.

11. The combination set forth in claim 3, wherein the stationary member is threadedly adjustable toward and away from the manually operable lever for varying the spaced relationship of said motor support to the driven shaft, whereby to adjust the tension of the belt.

FLOYD R. NELSON.